US 12,160,196 B2

(12) United States Patent
He et al.

(10) Patent No.: US 12,160,196 B2
(45) Date of Patent: Dec. 3, 2024

(54) SENSEFET FOR MOTOR CONTROL

(71) Applicant: Alpha and Omega Semiconductor International LP, Toronto (CA)

(72) Inventors: ChengYuan He, Sunnyvale, CA (US); Sitthipong Angkititraku, Dublin, CA (US); Jian Yin, San Ramon, CA (US); Lin Chen, San Jose, CA (US)

(73) Assignee: Alpha and Omega Semiconductor International LP, Toronto (CA)

( * ) Notice: Subject to any disclaimer, the term of this patent is extended or adjusted under 35 U.S.C. 154(b) by 101 days.

(21) Appl. No.: 18/049,969

(22) Filed: Oct. 26, 2022

(65) Prior Publication Data

US 2024/0146218 A1 May 2, 2024

(51) Int. Cl.
| | | |
|---|---|---|
| *G01R 19/165* | (2006.01) | |
| *H02P 6/28* | (2016.01) | |
| *H02P 27/08* | (2006.01) | |
| *H02K 7/14* | (2006.01) | |

(52) U.S. Cl.
CPC ............... *H02P 6/28* (2016.02); *H02P 27/08* (2013.01); *H02K 7/145* (2013.01)

(58) Field of Classification Search
CPC .... H02P 6/28; H02P 8/12; H02P 21/22; H02P 27/04; H02P 27/06; H02P 27/08; H03K 5/22; H03K 17/687; G01R 19/145; G01R 19/15; G01R 19/165; G01R 19/16566; G01R 19/16571; G01R 19/175

See application file for complete search history.

(56) References Cited

U.S. PATENT DOCUMENTS

| | | | |
|---|---|---|---|
| 7,843,181 B2 | 11/2010 | Capilla et al. | |
| 10,361,695 B2* | 7/2019 | Chauhan | ............ G01R 19/0092 |
| 11,650,231 B2* | 5/2023 | Zhao | .................. G01R 19/0023 |
| | | | 324/76.11 |

(Continued)

OTHER PUBLICATIONS

Aiello, et al., A New Mirroring Circuit for Power MOS Current Sensing Highly Immune to EMI, Open Access Sensors, published Jan. 31, 2013, 16 pages.

(Continued)

*Primary Examiner* — Long Nguyen
(74) *Attorney, Agent, or Firm* — Thompson Patent Law Offices PC (57) ABSTRACT

Apparatus and associated methods relate to a Source Terminal Replication Compensation Circuit for simulating an accurate fraction of a load current. In an illustrative example, a Source Terminal Replication Compensation Circuit (STRCC) may be connected to a motor driving circuit. The STRCC, for example, may include a simulation transistor configured to have a simulated structure of a main transistor in a motor driving circuit. The STRCC may include, for example, a disturbance rejection module (DRM). The DRM may be connected to a source terminal of the sense transistor, and a source terminal of the main transistor. When the DRM is connected to a current sensing resistor, a sense current is generated as a predetermined fraction of a load current of the motor driving circuit, wherein the predetermined fraction is less than 1%. Various embodiments may advantageously reduce heat dissipations at the current sensor resistor.

18 Claims, 6 Drawing Sheets

(56) References Cited

U.S. PATENT DOCUMENTS

2013/0278199 A1    10/2013  Otani et al.

OTHER PUBLICATIONS

Li, et al., Maximum Power Enhancement Techniques for SO-8 Power MOSFETs, Fairchild Semiconductor, Apr. 1996, 16 pages.
ON Semiconductor, AND8093/D Current Sensing Power MOSFETS, Semiconductor Components Industries, Mar. 2017, 13 pages.
Starks, A, AND9039/D Using SENSEFET ® with CAT2300 in Load Switch Applications, ON Semiconductor, Aug. 2011, 5 pages.
Yiu, C., Gain-Reconfigurable Current-Sensing Circuit For High-Frequency Low-Power DC-DC Converters, University of Toronto, 2010, 95 pages.

* cited by examiner

SENSEFET FOR MOTOR CONTROL

TECHNICAL FIELD

Various embodiments relate generally to power efficient MOSFET driver circuits.

BACKGROUND

Humans have long been using tools to improve one's ability to work or modify features of a surrounding environment. Tools can be made of stone, wood, and/or metal. Some tools may be large and stationary (e.g., a large machinery, a vehicle assembly line). Some tools may be portable (e.g., a hand tool).

Portable tools may be powered by different power sources. For example, some portable tools (e.g., a handheld hammer) may be powered by manpower. In some examples, portable tools may be power tools that are driven by motors. The motors may, for example, be driven by an internal combustion engine. Some motors may be hydraulically driven by, for example, compressed air and/or hydraulic fluid. Some motors may be driven by natural power sources including, for example, wind, moving water, and/or other natural power. In some examples, power tools may be driven by electric motors.

The power tools may include an alternating current (AC) power source and/or a direct current (DC) power to supply power to the electric motor. The power tool may, for example, include electronic circuits to regulate the received power supplied to the electric motor. For example, the power tool may include a user interface to allow a user to selectively adjust an output of the power tool. The user interface, for example, may be operably connected to the electronic circuit such that a response of the electric motor may be selectively controlled.

SUMMARY

Apparatus and associated methods relate to a Source Terminal Replication Compensation Circuit for simulating an accurate fraction of a load current. In an illustrative example, a Source Terminal Replication Compensation Circuit (STRCC) may be connected to a motor driving circuit. The STRCC, for example, may include a simulation transistor configured to have a simulated structure of a main transistor in a motor driving circuit. The STRCC may include, for example, a disturbance rejection module (DRM). The DRM may be connected to a source terminal of the sense transistor, and a source terminal of the main transistor. When the DRM is connected to a current sensing resistor, a sense current is generated as a predetermined fraction of a load current of the motor driving circuit, wherein the predetermined fraction is less than 1%. Various embodiments may advantageously reduce heat dissipations at the current sensor resistor.

Various embodiments may achieve one or more advantages. For example, some embodiments may reduce circuit board size of the motor driving circuit. Some embodiments may, for example, decouple a source terminal voltage to a sense voltage, which may, for example, advantageously improve measurement accuracy. Some embodiments, for example, may reduce measurement fluctuations due to temperature variations.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 1:
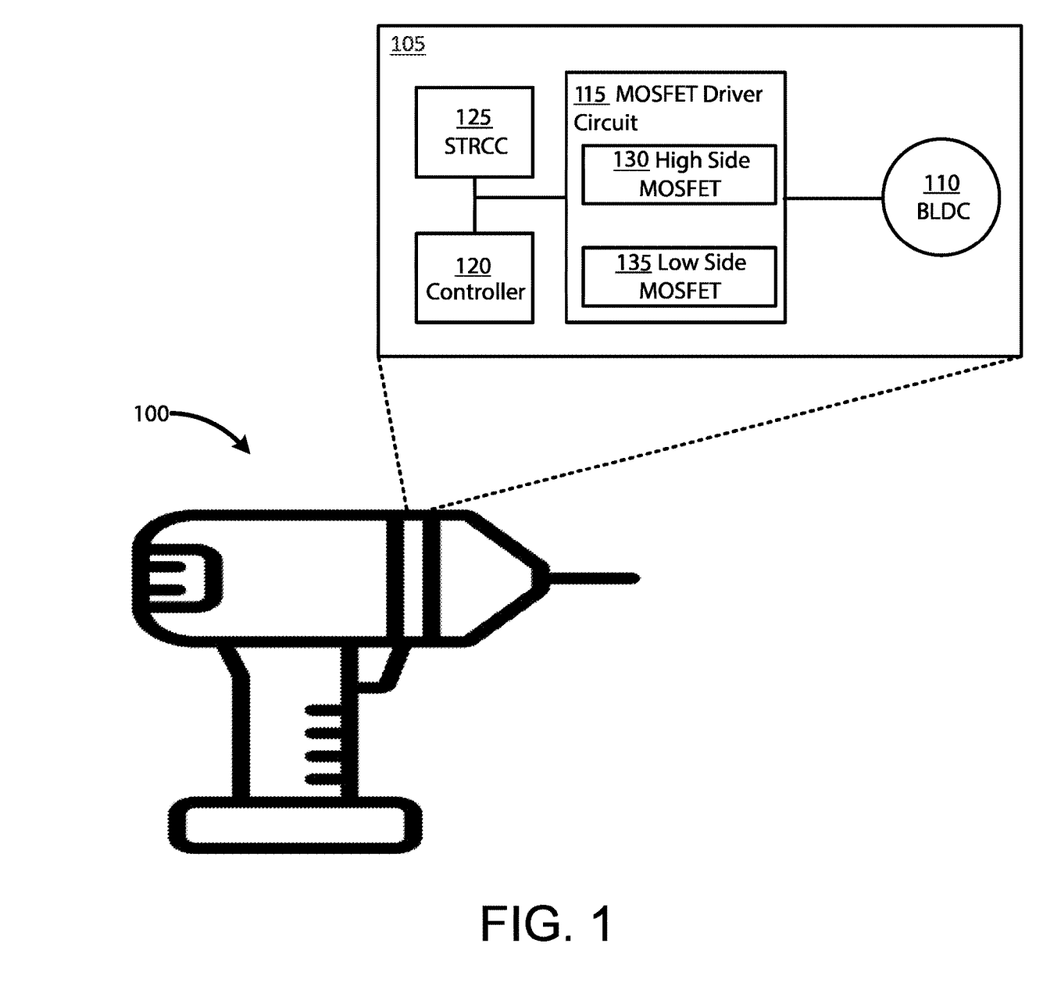
FIG. 1 depicts an exemplary Source Terminal Replication Compensation Circuit (STRCC) employed in an illustrative use-case scenario.

FIG. 1 depicts an exemplary Source Terminal Replication Compensation Circuit (STRCC) employed in an illustrative use-case scenario. In the depicted scenario, a power tool 100 includes a power tool control circuit (PTCC 105). For example, the power tool 100 may be a handheld power tool (e.g., a portable power screwdriver, a power drill). For example, the PTCC 105 may be operably coupled to an electric motor of the power tool 100. For example, the PTCC 105 may be connected to a power source of the power tool 100 to drive the electric motor.

As shown, the PTCC 105 includes a brushless direct current (BLDC) motor 110. For example, the BLDC motor 110 may be a synchronous motor using a direct current power supply. In some implementations, the PTCC 105 may drive other types of motor. For example, the PTCC 105 may be configured to drive a brushed DC motor. For example, the PTCC 105 may be configured to drive a unipolar motor. For example, the PTCC 105 may be configured to drive a servomotor. In some examples, the PTCC 105 may drive an AC motor.

In this example, a power tool control circuit (PTCC 105) includes a MOSFET driver circuit 115 to drive the BLDC motor 110. For example, the MOSFET driver circuit 115 may receive a power signal from a DC power source. The received power signal, for example, may be regulated by the MOSFET driver circuit 115 to be supplied to the BLDC motor 110.

In this example, the MOSFET driver circuit 115 regulates the received power signal based on a control input from a controller 120. For example, the controller 120 may generate the control input based on a user input to control a response of the power tool (e.g., to increase power or to decrease power). In the depicted example, the controller 120 is coupled to a STRCC 125. For example, the controller 120 may generate the control input based on a feedback signal from the STRCC 125.

The MOSFET driver circuit 115 includes a high side MOSFET driver circuit 130, and a low side MOSFET driver circuit 135. For example, the high side MOSFET driver circuit 130 and the low side MOSFET driver circuit 135 may be configured to generate synchronous power signals to drive the BLDC motor 110 based on the control input received from the controller 120.

In some implementations, the controller 120 may generate the control input based on a feedback current input from the high side MOSFET driver circuit 130 and/or the low side MOSFET driver circuit 135. For example, the feedback current input may be measured by a voltage differential at a current sensor resistor of a predetermined resistance. Because the resistance of the current sensor resistor is known, the feedback current of the BLDC motor 110 may be calculated based on Ohm's law (V=I·R).

However, due to the large current used for driving the power tool 100, sensing a driving current directly at the high side MOSFET driver circuit 130 or the low side MOSFET driver circuit 135 may require a large current sensor resistor. For example, the energy wastage may be high based on Joule's law. Also, the wasted energy may contribute to heat dissipation at the current sensor resistor that increases a temperature at the current sensor resistor. In some examples, the predetermined resistance may vary due to temperature variations. Accordingly, the accuracy of the measured feedback current may decrease, for example.

In some implementations, the STRCC 125 may include a simulation circuit that may emulate boundary conditions of the MOSFET driver circuit 115. For example, the STRCC 125 may include a circuit to track terminal voltages of nodes of the high side MOSFET driver circuit 130 and/or the low side MOSFET driver circuit 135. In some implementations, the STRCC 125 may generate a predetermined fraction (e.g., $10^{-2}$, $10^{-4}$, $10^{-6}$, $10^{-7}$, $10^{-10}$) of response of the MOSFET driver circuit 115. For example, when activated, the STRCC 125 may generate a current at the predetermined fraction of a main current flow from the MOSFET driver circuit 115 to a load (e.g., the BLDC motor 110. For example, the STRCC 125 may advantageously provide the feedback current input with reduced heat dissipation and improved power efficiency.

Figure 2A:
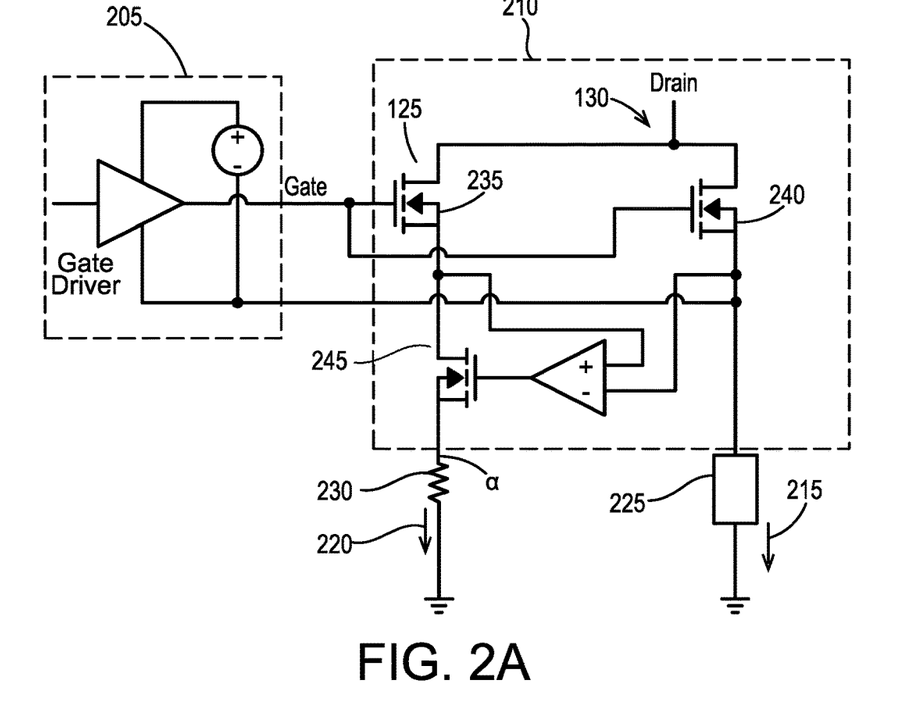
FIG. 2A, FIG. 2B, and FIG. 2C depict exemplary electrical schematics of an exemplary STRCC applied to a high side metal oxide semiconductor field effect transistor (MOSFET) driver circuit.
Figure 2B:
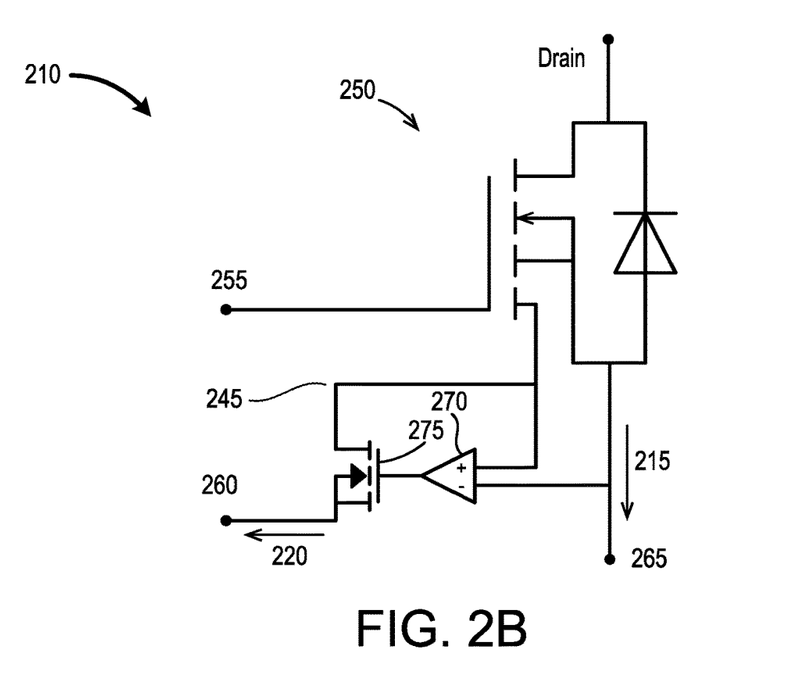
Figure 2C:
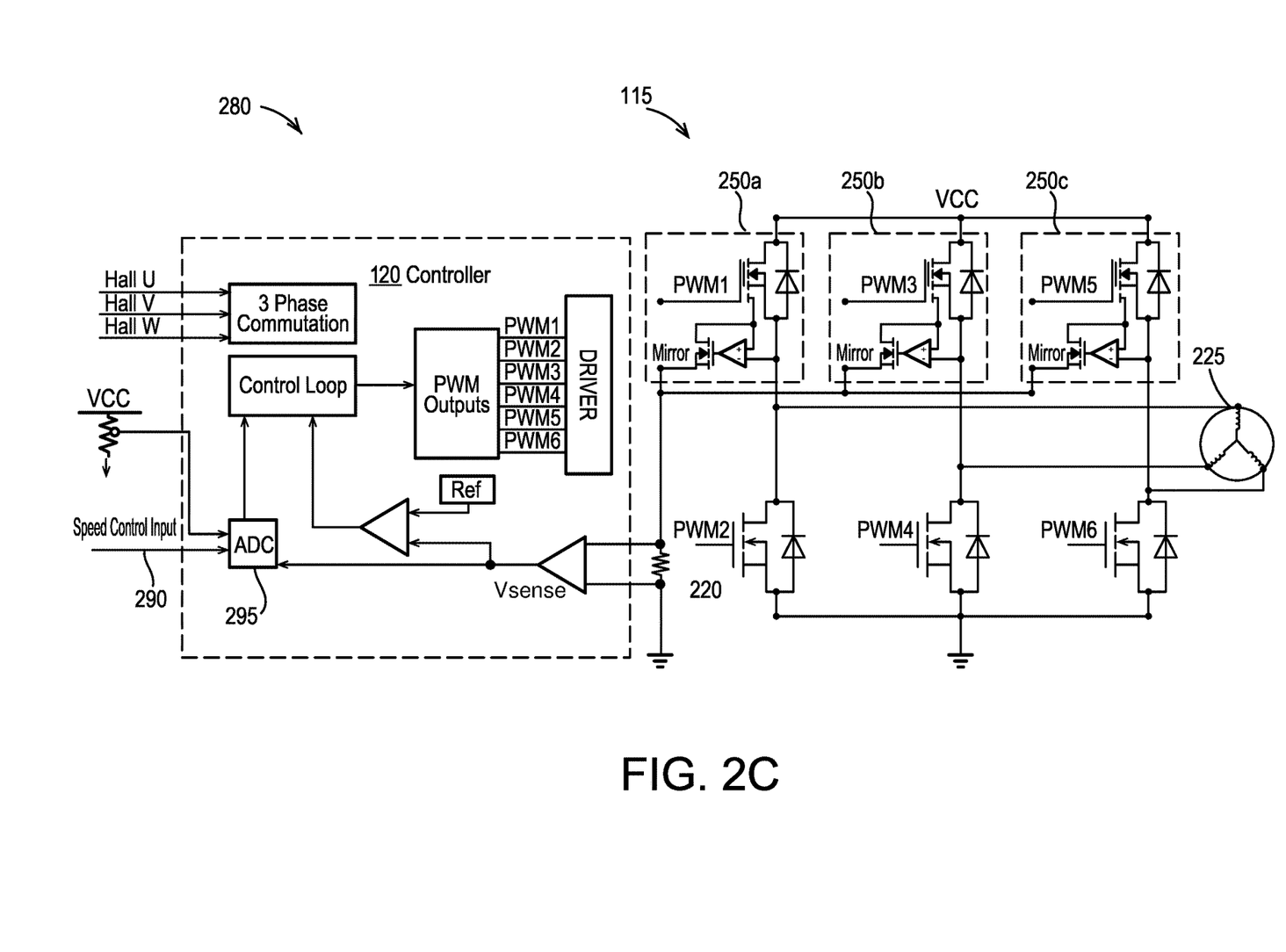

FIG. 2A, FIG. 2B, and FIG. 2C depict exemplary electrical schematics of an exemplary STRCC applied to a high side metal oxide semiconductor field effect transistor (MOSFET) driver circuit. As shown in FIG. 2A, the high side MOSFET driver circuit 130 is driven by a gate driver circuit 205. The high side MOSFET driver circuit 130, in this example, is coupled to the STRCC 125 to form a high side driver circuit 210. In some embodiments, the high side driver circuit 210 may be a single integrated circuit package including both the controller 120 and the STRCC 125.

The high side driver circuit 210 includes a load path 215, and a sense path 220. For example, the high side driver circuit 210 may include a high side sense FET integrated circuit. As shown, the load path 215 is flowing from the controller 120 to a load 225 (e.g., the BLDC motor 110). The sense path 220 flows from the STRCC 125 to a current sensing resistor 230. In various examples, a sensing resistor may be a small size resistor that has a rating of a predetermined fraction of a resistance of the load path 215. For example, the current sensing resistor 230 may be a resistor with a predetermined resistance (e.g., 50 Ohms, 100 Ohms, 1000 Ohms). In various implementations, the current sensing resistor 230 may be substantially less than a resistor used to directly measure the load current at the load path 215. Accordingly, using the STRCC 125 may advantageously reduce a size requirement for a circuit board space for implementing a motor control circuit (e.g., the PTCC 105).

In this example, the STRCC 125 includes a simulating FET (SFET 235). For example, the SFET 235 may be a SENSEFET configured to emulate a structure of a main FET 240 of the controller 120. In some implementations, when substantially similar boundary conditions are applied to gate, drain, and source terminals of the SFET 235 and the main FET 240, the SFET 235 may be configured to have a current response at a source terminal of the SFET 235 at a predetermined fraction (e.g., $10^{-2}$, $10^{-4}$, $10^{-6}$, $10^{-7}$, $10^{-10}$) of a current response at a source terminal of the main FET 240. In some examples, the predetermined fraction may be determined based on structures of the SFET 235 and the main FET 240.

In this example, the gate terminal of the SFET 235 and the gate terminal of the main FET 240 are connected to a gate voltage generated by the gate driver circuit 205. The drain terminal of the SFET 235 and the drain terminal of the main FET 240 are connected to a common drain voltage node.

The STRCC 125 also includes a disturbance rejection module (DRM 245). As shown, the DRM 245 is connected to the source terminal of the main FET 240 and the source terminal of the SFET 235. In some implementations, the DRM 245 may include a feedback circuit configured to regulate the source voltage of the SFET 235 to track the source voltage of the main FET 240. Various embodiments for tracking the source voltage of the main FET 240 are described in further details below with reference to FIG. 2B.

As shown, the DRM 245 also decouple the source terminal of the SFET 235 and a connecting node a of the current sensing resistor 230. In some implementations, by decoupling the source terminal of the SFET 235 and the node a, the source voltage at the SFET 235 may be substantially independent of a voltage at the node a. In various implementations, the DRM 245 may advantageously allow a wide range of selection for the current sensing resistor 230 because the node a and the source voltage of the SFET 235 are decoupled. For example, measuring accuracy of a current at the sense path 220 may increase.

As shown in FIG. 2B, the high side driver circuit 210 may include the SFET 235, the main FET 240, and the DRM 245 integrated in a high side integrated package 250. For example, the high side integrated package 250 may include a gate node 255, a sense current node 260, a load current node 265, and a drain node. For example, the gate node 255 may be coupled to the gate driver circuit 205. For example, the current node 260 may be coupled to the current sensing resistor 230. For example, the current node 265 may be coupled to the load 225.

In this example, the DRM 245 includes an error amplifier 270, and a buffer transistor 275. In some implementations, the error amplifier 270 may include a non-inverting input and an inverting input. For example, the non-inverting input may be coupled to a source terminal of the SFET 235. For example, the inverting input may be coupled to the source terminal of the main FET 240. As shown, an output terminal of the error amplifier 270 is coupled to a gate terminal of the buffer transistor 275. A drain terminal of the buffer transistor 275 is coupled to the source terminal of the SFET 235 and the non-inverting input of the error amplifier 270. In operation, for example, the DRM 245 may regulate a voltage at the source terminal of the SFET 235 to substantially follow a voltage at the source terminal of the main FET 240.

In various embodiments, the voltage at the source terminal of the SFET 235 may be decoupled from the voltage at the current node 260 by the buffer transistor 275. Accordingly, measurement reliability of a current of the sense path 220 may be increased.

As shown in FIG. 2C, an exemplary motor driving circuit (MDC 280) for a three-phase motor is shown. In this example, the MDC 280 is driving the load 225. For example, the load 225 may be a motor (e.g., a brushless motor). In some embodiments, the MDC 280 may be configured to drive other types of motors and/or load.

The load 225 is, in this example, driven by the high side MOSFET driver circuit 130 and the low side MOSFET driver circuit 135. The high side MOSFET driver circuit 130 and the low side MOSFET driver circuit 135, in this example, include three phases. As shown, each phase of the high side MOSFET driver circuit 130 and the low side MOSFET driver circuit 135 is connected to a control output of the controller 120 (PWM1, PWM2, PWM3, PWM4, PWM5, and PWM6). Each phase of the high side MOSFET driver circuit 130 is connected to the STRCC 125 in parallel. The high side MOSFET driver circuit 130 and the STRCC 125 are, in this example, combined into the integrated packages 250a, 250b, 250c.

The controller 120, in this example, receives speed control input 290. For example, the speed control input 290 may be received from a user interface. For example, the speed control input 290 may be received from a signal transmitted from a controlling device (e.g., a mobile device). The controller 120 also receives feedback input from the integrated packages 250a, 250b, and 250c. For example, the controller 120 may convert a current flowing through the current sensing resistor 230 into a sense voltage (Vsense) by a comparator. Analog signals, including the speed control input 290 and Vsense are converted into digital signals using an analog to digital converter 295.

In some implementations, the controller 120 may determine a control signal to the MOSFET driver circuit 115 based on the measured current as an accurate representation at a predetermined fraction of a current at the load 225 (e.g., the BLDC motor 110).

In some implementations, because the current sensing resistor 230 is of a smaller resistance than a current at the load path 215, temperature variation for measuring the main current is reduced. Accordingly, for example, power efficiency may advantageously be improved due to reduced heat dissipation at the current sensing resistor 230. For example, measurement reliability and accuracy due to temperature variations may advantageously be improved. In some embodiments, the high side integrated package 250 may save board space such that the MOSFET driver circuit 115 may be made smaller.

Figure 3A:
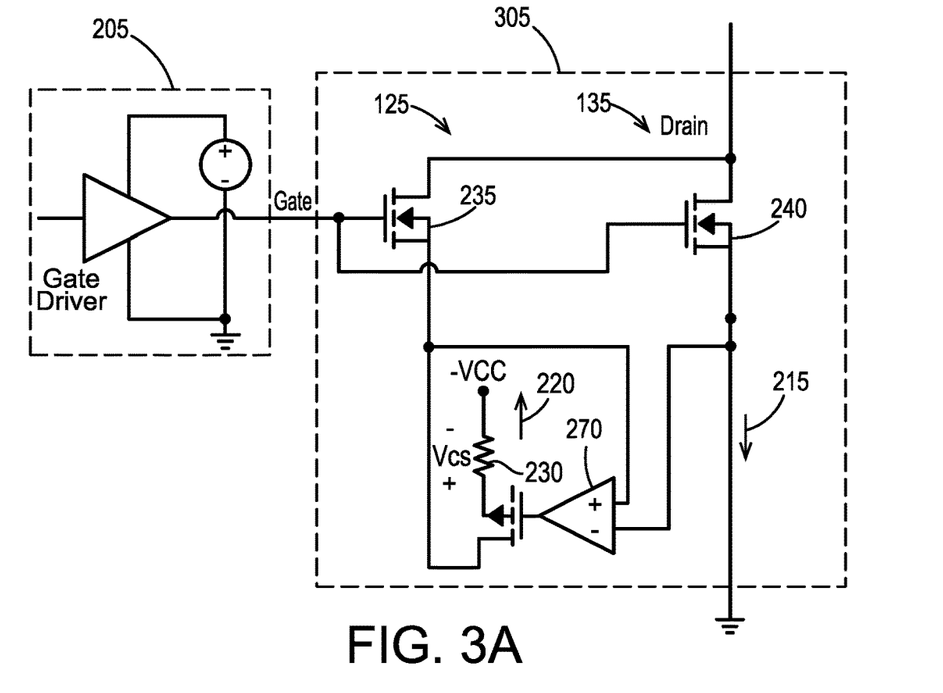
FIG. 3A, FIG. 3B, and FIG. 3C depict exemplary electrical schematics of an exemplary STRCC applied to a low side MOSFET driver circuit.
Figure 3B:
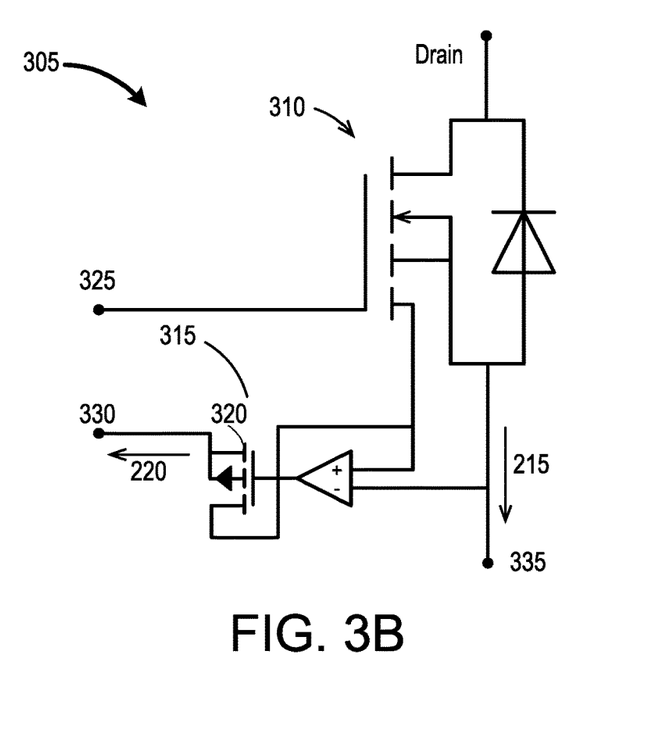
Figure 3C:
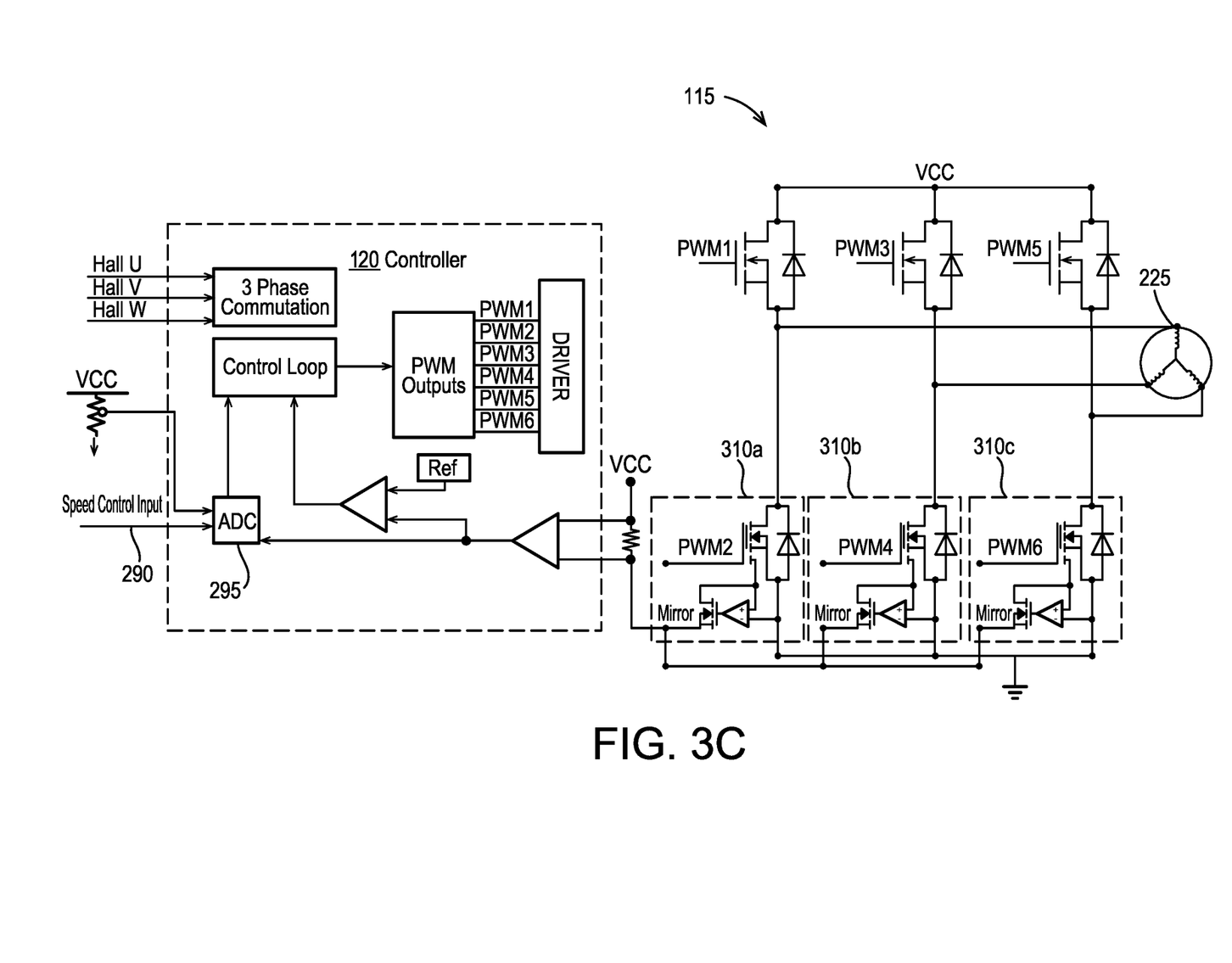

FIG. 3A, FIG. 3B, and FIG. 3C depict exemplary electrical schematics of an exemplary STRCC applied to a low side MOSFET driver circuit. As shown in FIG. 3A, a low side drive circuit 305 is coupled to the gate driver circuit 205. Similar to exemplary embodiments discussed with reference to FIGS. 2A-C, the STRCC 125 may simulate a sense current at the sense path 220 at a predetermined fraction of a main current at the load path 215. For example, the controller 120 may use a sense voltage Vcs measured across the current sensing resistor 230 to accurately estimate the load current in the load path 215.

As shown in FIG. 3B, the low side drive circuit 305 may be integrated into a low side integrated package 310. The low side integrated package 310 includes a DRM 315. In this example, the DRM 315 includes buffer transistor 320. As shown, the buffer transistor 320 is a p-type FET.

The low side integrated package 310 includes a gate node 325, a sense current node 330, a load current node 335, and a drain node. For example, the gate node 325 may be coupled to the gate driver circuit 205. For example, the current node 260 may be coupled to the current sensing resistor 230. For example, the load current node 265 may be coupled to the load 225.

In various implementations, the low side integrated package 310 may provide an integrated circuit solution to accurately measure the load current at the load path 215 using the sense current flowing at the sense current node 330 and a predetermined fraction. For example, the predetermined fraction may be determined based on structures of the SFET 235 and the main FET 240.

As shown in FIG. 3C, an exemplary circuit using the low side drive circuit 305 is shown. In this example, three low side integrated packages 310a, 310b, 310c are coupled to the load 225. For example, the controller 120 may control the MOSFET driver circuit 115 based on a voltage measured at a mirror node. For example, the DRM 315 may decouple the voltage at the mirror node from the source terminal voltages of the SFET 235 and the main FET 240 in the low side integrated packages 310a, 310b, 310c.

Figure 4:
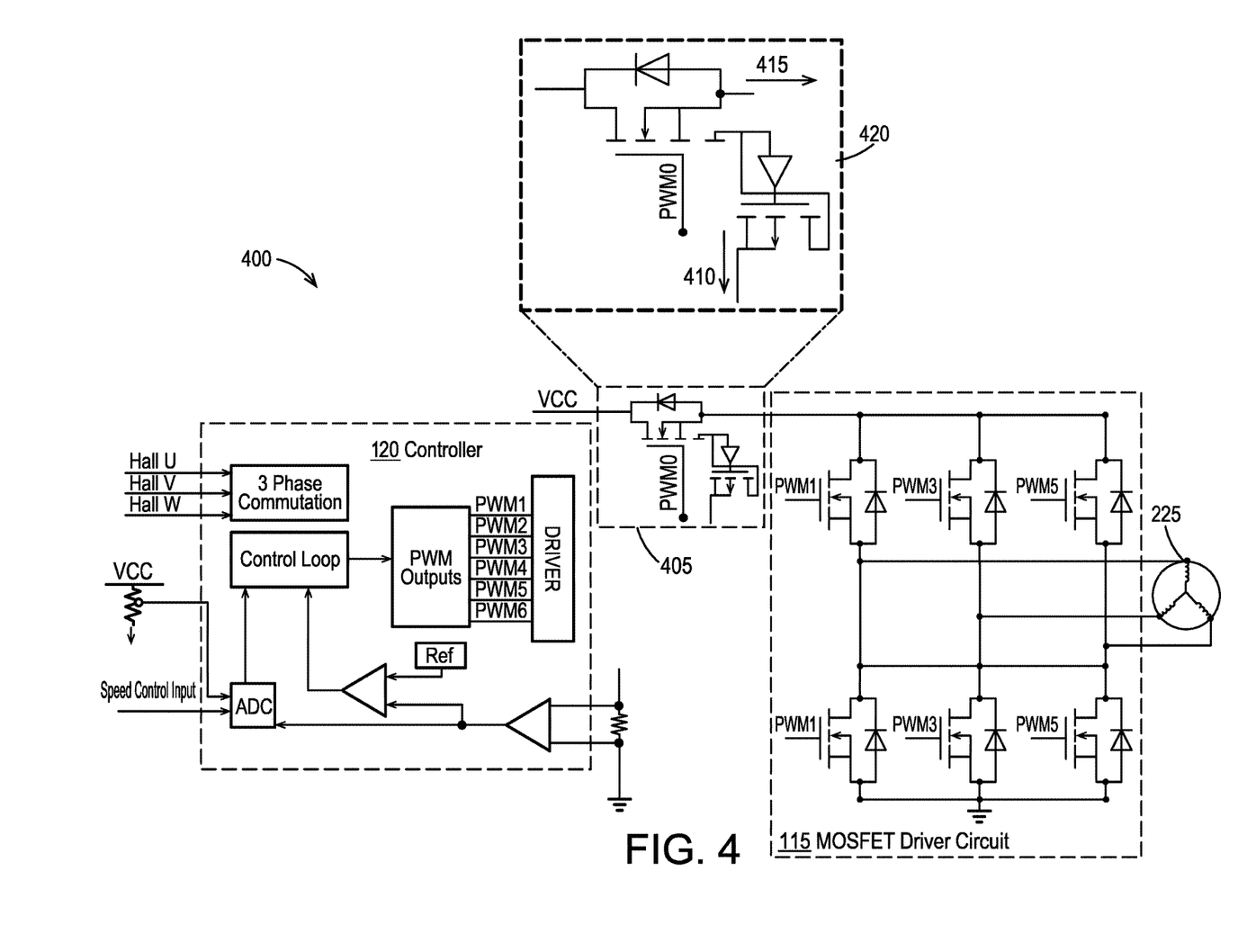
FIG. 4 depicts an exemplary electrical schematic of an exemplary STRCC applied to a DC switch circuit.

FIG. 4 depicts an exemplary electrical schematic of an exemplary STRCC applied to a DC switch circuit. In this example, a motor control circuit 400 includes the controller 120, the MOSFET driver circuit 115 and a STRCC 405. For example, the STRCC 405 may limit an inrush current limit. The STRCC 405 may, for example, measure a total current of the motor control circuit 400. In some examples, the STRCC 405 may limit the inrush current and measure the total current without an additional current sensor. The STRCC 405 is coupled to a VCC node. The STRCC 405 is serially connecting the VCC node to the MOSFET driver circuit 115 in this example. For example, the VCC node may be connected to a DC power source of the power tool 100. The STRCC 405 receives control input PWM0 from the controller 120, for example.

As shown, the STRCC 405 includes a sense path 410 and a load path 415. The STRCC 405 further includes a DRM 420 that is configured to generate a sense current at the sense path 410 as a predetermined fraction of a load current at the load path 415. In some embodiments, the controller 120 may generate the PWM0 based on the sense current.

Although various embodiments have been described with reference to the figures, other embodiments are possible.

For example, in some embodiments, the DRM may include a different arrangement of feedback circuits coupled to a buffer component to achieve the functions of the DRM. In some examples, the error amplifier 270 may be an operational amplifier. In some examples, the error amplifier 270 may be other types of feedback amplifiers. For example, the buffer transistor 275 may be a P-type MOSFET. In some examples, the buffer transistor 275 may be an N-type MOSFET. For example, the buffer transistor 275 may be an IGBT. For example, the buffer transistor 275 may be a BJT. In some examples, the buffer transistor 275 may be other silicon based transistor.

In some implementations, the MOSFET driver circuit 115 may be configured to drive a single or multiple phased load. For example, the MOSFET driver circuit 115 as described with reference to FIGS. 2C and 3C may be configured to drive a four phased, six phased, twelve phased load, or other multi-phased load.

Although an exemplary system has been described with reference to FIGS. 1-4, other implementations may be deployed in other industrial, scientific, medical, commercial, and/or residential applications.

In an illustrative aspect, a current sensing circuit may include a sense transistor configured to have a simulated structure of a main transistor in a load driving circuit. The current sensing circuit may include a disturbance rejection module (DRM) connected to the sense transistor and the main transistor. For example, the DRM may be configured such that a voltage at a source terminal of the sense transistor tracks a voltage at a source terminal of the main transistor.

For example, the DRM may include a feedback circuit and a buffer circuit configured such that an output voltage of the current sensing circuit and the voltage at the source terminal of the sense transistor are decoupled. For example, when the current sensing circuit is connected to a current sensing resistor, a sense current may be generated as a predetermined fraction of a load current of the load driving circuit. For example, the predetermined fraction is less than 1%. For example, the current sensing resistor may have a rating of less than 1000 Ohms. For example, heat dissipation at the current sensing resistor may be reduced to improve a power efficiency of the current sensing circuit.

For example, the load driving circuit is a motor driving circuit. For example, the feedback circuit may include an error amplifier comprising a non-inverting input and an inverting input. For example, the source terminal of the sense transistor may be connected to the non-inverting input. For example, the source terminal of the main transistor may be connected to the inverting input.

For example, the DRM and the load driving circuit may be integrated in a circuit package. For example, the load driving circuit may include a multi-phase circuit. For example, the current sensing circuit may be coupled to each phase of the load driving circuit in parallel. For example, each phase of the load driving circuit may include a high-side switch and a low-side switch. For example, the current sensing circuit may be coupled to the high-side switch of the load driving circuit.

For example, each phase of the load driving circuit further may include a high-side switch and a low-side switch. For example, the current sensing circuit may be coupled to the low-side switch of the load driving circuit. For example, the current sensing circuit may be coupled to a DC switch circuit connected to a power supply. For example, the current sensing circuit may be configured to serially connect the DC switch circuit to the load driving circuit. For example, the current sensing circuit may be configured to limit an inrush current and measure a total current of the load driving circuit.

For example, the current sensing circuit may be configured to limit an inrush current and measure a total current of the load driving circuit without additional sensing element.

In an illustrative aspect, a current sensing circuit may include a sense transistor configured to have a simulated structure of a main transistor in a load driving circuit. For example, the current sensing circuit may include a disturbance rejection module (DRM) connected to the sense transistor and the main transistor, wherein the DRM is configured such that a voltage at a source terminal of the sense transistor tracks a voltage at a source terminal of the main transistor. For example, when the current sensing circuit is connected to a current sensing resistor, a sense current may be generated as a function of a load current of the load driving circuit such that the sense current is substantially a predetermined fraction of the load current, and the predetermined fraction is less than 1%. For example, heat dissipation at the current sensing resistor may be reduced to improve a power efficiency of the current sensing circuit.

For example, the DRM may include a feedback circuit and a buffer circuit. For example, an output voltage associated with the sense current and the voltage at the source terminal of the sense transistor may be decoupled.

For example, the feedback circuit may include an error amplifier may include a non-inverting input and an inverting input. For example, the source terminal of the sense transistor may be connected to the non-inverting input. For example, the source terminal of the main transistor may be connected to the inverting input.

For example, the DRM and the load driving circuit may be integrated in a circuit package. For example, the load driving circuit may include a multi-phase circuit. For example, the current sensing circuit may be coupled to each phase of the load driving circuit in parallel.

For example, each phase of the load driving circuit may include a high-side switch and a low-side switch. For example, the current sensing circuit may be coupled to the high-side switch of the load driving circuit.

For example, each phase of the load driving circuit further may include a high-side switch and a low-side switch. For example, the current sensing circuit may be coupled to the low-side switch of the load driving circuit.

For example, the current sensing circuit may be coupled to a DC switch circuit connected to a power supply. For example, the current sensing circuit may be configured to serially connect the DC switch circuit to the load driving circuit. For example, the current sensing resistor may have a rating of less than 1000 Ohms.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A current sensing circuit comprising:
    a sense transistor configured to have a simulated structure of a main transistor in a load driving circuit; and,
    a disturbance rejection module (DRM) connected to the sense transistor and the main transistor, wherein the DRM is configured such that a voltage at a source terminal of the sense transistor tracks a voltage at a source terminal of the main transistor and, wherein:
        the DRM comprises a feedback circuit and a buffer circuit configured such that an output voltage of the current sensing circuit and the voltage at the source terminal of the sense transistor are decoupled,
        the current sensing circuit is coupled to a DC switch circuit connected to a power supply, and,
        the current sensing circuit is configured to serially connect the DC switch circuit to the load driving circuit, such that the current sensing circuit is configured to limit an inrush current and measure a total current of the load driving circuit, and,
        when the current sensing circuit is connected to a current sensing resistor, a sense current is generated as a predetermined fraction of a load current of the load driving circuit, wherein the predetermined fraction is less than 1% such that,
            the current sensing resistor has a rating of less than 1000 Ohms, and,
            heat dissipation at the current sensing resistor is reduced to improve a power efficiency of the current sensing circuit.

2. The current sensing circuit of claim 1, wherein the load driving circuit is a motor driving circuit.

3. The current sensing circuit of claim 1, wherein:
    the feedback circuit comprises an error amplifier comprising a non-inverting input and an inverting input, the source terminal of the sense transistor is connected to the non-inverting input, and, the source terminal of the main transistor is connected to the inverting input.

4. The current sensing circuit of claim 1, wherein the DRM and the load driving circuit are integrated in a circuit package.

5. The current sensing circuit of claim 1, wherein:
the load driving circuit comprises a multi-phase circuit, and,
the current sensing circuit is coupled to each phase of the load driving circuit in parallel.

6. The current sensing circuit of claim 1, wherein:
the load driving circuit further comprises a high-side switch and a low-side switch, and,
the current sensing circuit is coupled to the high-side switch of the load driving circuit.

7. The current sensing circuit of claim 1, wherein:
of the load driving circuit further comprises a high-side switch and a low-side switch, and,
the current sensing circuit is coupled to the low-side switch of the load driving circuit.

8. The current sensing circuit of claim 1, wherein the current sensing circuit is configured to limit an inrush current and measure a total current of the load driving circuit without additional sensing element.

9. A current sensing circuit comprising:
a sense transistor configured to have a simulated structure of a main transistor in a load driving circuit; and,
a disturbance rejection module (DRM) connected to the sense transistor and the main transistor, wherein the DRM is configured such that a voltage at a source terminal of the sense transistor tracks a voltage at a source terminal of the main transistor and, wherein:
the current sensing circuit is coupled to a DC switch circuit connected to a power supply,
the current sensing circuit is configured to serially connect the DC switch circuit to the load driving circuit, and,
when the current sensing circuit is connected to a current sensing resistor, a sense current is generated as a function of a load current of the load driving circuit such that the sense current is substantially a predetermined fraction of the load current, and the predetermined fraction is less than 1%, such that, heat dissipation at the current sensing resistor is reduced to improve a power efficiency of the current sensing circuit.

10. The current sensing circuit of claim 9, wherein the DRM comprises a feedback circuit and a buffer circuit, such that an output voltage associated with the sense current and the voltage at the source terminal of the sense transistor are decoupled.

11. The current sensing circuit of claim 10, wherein:
the feedback circuit comprises an error amplifier comprising a non-inverting input and an inverting input,
the source terminal of the sense transistor is connected to the non-inverting input, and,
the source terminal of the main transistor is connected to the inverting input.

12. The current sensing circuit of claim 10, wherein the DRM and the load driving circuit are integrated in a circuit package.

13. The current sensing circuit of claim 9, wherein:
the load driving circuit comprises a multi-phase circuit, and,
the current sensing circuit is coupled to each phase of the load driving circuit in parallel.

14. The current sensing circuit of claim 9, wherein:
the load driving circuit further comprises a high-side switch and a low-side switch, and,
the current sensing circuit is coupled to the high-side switch of the load driving circuit.

15. The current sensing circuit of claim 9, wherein:
the load driving circuit further comprises a high-side switch and a low-side switch, and,
the current sensing circuit is coupled to the low-side switch of the load driving circuit.

16. The current sensing circuit of claim 9, wherein the current sensing circuit is configured to limit an inrush current and measure a total current of the load driving circuit without additional sensing element.

17. The current sensing circuit of claim 9, wherein the current sensing resistor has a rating of less than 1000 Ohms.

18. The current sensing circuit of claim 9, wherein the load driving circuit is configured as a motor driving circuit.

* * * * *